Dec. 18, 1934.  A HAIGIS  1,985,091
ROTOR FOR SELF STARTING SYNCHRONOUS ELECTRIC
MOTORS FOR CLOCKS AND THE LIKE
Filed Jan. 8, 1931
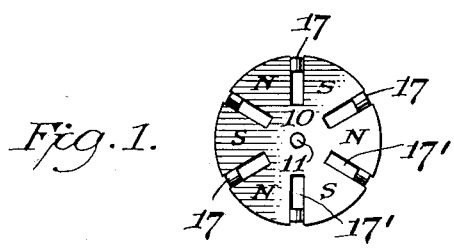
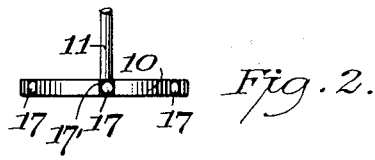
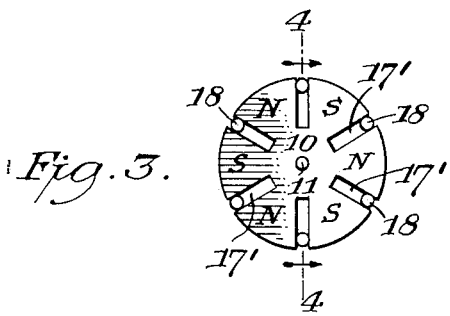
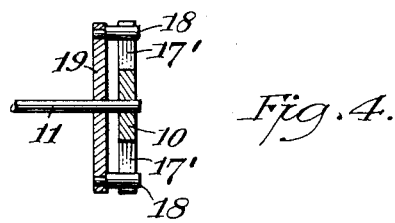
INVENTOR.
Alfred Haigis,
BY
Harold D. Benney
ATTORNEY Patented Dec. 18, 1934

1,985,091

UNITED STATES PATENT OFFICE 1,985,091

ROTOR FOR SELF-STARTING SYNCHRONOUS ELECTRIC MOTORS FOR CLOCKS AND THE LIKE

Alfred Haigis, Baden, Germany, assignor to Kienzle Taxameter und Apparate A. G., Schwartzwald, Germany, a corporation of Germany Application January 8, 1931, Serial No. 507,387
In Germany November 5, 1930

4 Claims. (Cl. 172—120)

The present invention relates to self-starting synchronous motors, and more particularly to improvements in the armatures, or rotors, of synchronous motors employed to operate horological devices.

In some types of synchronous motors the rotor construction is such that, upon starting, the lines of force of the alternating current field are caused to cut through the permanent magnetic poles of the rotor, thereby permanently weakening the magnetism of the rotating armature to an undesired degree. To overcome this difficulty, and to obtain additional advantages, imperfect, or incomplete, magnetic shunts are provided, according to the present invention, between the permanent, magnetic poles of a synchronous motor armature.

In addition to the main objects of the present invention as stated heretofore, it is an important object of this invention to provide a synchronous motor construction wherein the useful field in the motor consists only of a residual stray, or leakage, field of the armature for which the permanent magnetism in the steel armature constitutes a storage, or reserve, force, the imperfect, or incomplete, magnetic shunts being in the form of soft iron pieces, either separate or in unit assembly, or being arranged in disc form coordinated to the rotor.

Another object of the invention is to provide shunts between the poles of a synchronous motor armature, which shunts may be cup-shaped, or if desired, disposed in a ring form about the periphery of the said armature.

Still other objects of the invention are to improve generally the efficiency of synchronous motors, and to particularly provide a synchronous motor construction for horological devices which is not only durable and reliable in operation, but economically assembled.

The novel features which are believed to be characteristic of this invention are set forth particularly in the appended claims, the invention itself, however, as to both its organization and method of operation will best be understood by reference to the following description taken in connection with the drawing in which there are indicated several arrangements whereby the invention may be carried into effect.

In the accompanying drawing,

Fig. 1 is a plan elevation of a synchronous motor armature, embodying the present invention;

Fig. 2 is a front elevation of the armature in Fig. 1;

Fig. 3 is a plan elevation of a modified form of the invention;

Fig. 4 is a section taken on line 4—4, Fig. 3, looking in the direction of the arrows.

Referring to the accompanying drawing wherein like characters of reference indicate the same parts in the different views, there is shown in Figs. 1 and 2 sufficient detail to enable one skilled in the electric clock art to understand the present invention. The conventional synchronous rotor 10 is shown in these two figures, as well as Figs. 3-8 inclusive, as seated upon the shaft 11 of the synchronous motor rotor which itself is not shown.

To accomplish the objects of the invention, a cylindrical pin 17 made of soft-iron material is partially driven into the pole gaps 17' provided between adjacent pairs of north and south poles. The pins 17 are disposed near the peripheral portions of the rotor, and thus constitute imperfect magnetic shunts between the adjacent unlike rotor poles, and as the pins are soft iron and are magnetically conductive without possessing inherent magnetic force, they are magnetically neutral and form neutral shunts. As the active cross-section of the shunt is very small, they form imperfect shunts.

In a similar manner, in the modification in Figs. 3 and 4, pins 18, also of cylindrical shape, are secured upon a circular carrier disk 19 spaced from the rotor disk 10. The pins 18, in this case, are disposed laterally in the pole gaps 17' of the rotor 10, with the result that imperfect magnetic shunts are created between the poles.

The operation of the present arrangements should be obvious from the above detailed description. It is to be noted that the reluctance of the magnetic shunts disclosed in Figs. 1 to 4 is so high that the poles N and S outside these shunts are still able to set up leakage fluxes, or fields, these being of such size so that, on the one hand, the desired torque will still be obtainable with the motor running at synchronous speed, and that, on the other hand, self-starting of the motor may not be disturbed. It will be, further, appreciated that by means of the arrangements illustrated in Figs. 1 to 4, the flux lines of the alternating current field of the stator, are enabled to find a path by way of the shunts between the poles, should they happen to be opposite the polarity of the permanent magnetic rotor and encounter a corresponding reluctance at the instant of starting of the synchronous rotor. The permanent magnetism of the rotor, as will be seen, will not be weakened in such cases.

It should, also, be noted that another feeble useful stray field is constantly strengthened by the magnetic storage, or reserve, residing in the strong magnetic potential difference of the main flux between adjacent rotor teeth.

While there has been indicated and described several arrangements for carrying the invention into effect, it will be obvious to those skilled in the art that the invention is by no means limited to the particular organizations shown and described, but that many additional modifications in the arrangements may be used without departing from the scope of my invention as set forth in the appended claims.

What I claim is:

1. A rotor assembly, for a synchronous motor, comprising a shaft, an armature provided with spaced, constant unlike pole pieces affixed to the shaft, one or more disks disposed on said shaft in spaced relation with said armature, and soft iron elements carried by the disk and disposed between the pole pieces.

2. In combination, a shaft; a circular disk-shaped permanent magnet rotor thereon having deep radial slots therein forming a small central hub and a plurality of sector-shaped alternated pole pieces of unlike polarity extending from the hub; and soft iron pins snugly received in the outer ends of said slots respectively and forming imperfect magnetic shunts between the pole pieces.

3. In combination, a shaft; a circular disk-shaped permanent magnet rotor thereon having deep radial slots therein forming a small central hub and a plurality of sector-shaped alternated pole pieces of unlike polarity extending from the hub; a carrier disk coaxial on said shaft spaced from the rotor; and soft iron pins carried laterally on the disk parallel to the shaft and received snugly in the outer ends of said slots respectively, forming imperfect magnetic shunts between the pole pieces.

4. A rotor for a self-starting synchronous motor for clocks and the like, comprising a magnetic armature having spaced pole pieces of constant unlike polarity, and imperfect neutral magnetic shunts provided between the armature pole pieces so that the useful field in the motor consists only of the residual leakage field of the armature; the said shunts comprising pin-shaped, soft-iron elements, a disk associated with the armature, said pins being mounted on the disk and being disposed in the spaces between the armature pole pieces.

ALFRED HAIGIS.